INVENTOR.
NICHOLAS D. SKEER
BY [signature]
ATTORNEY

Dec. 19, 1967 N. D. SKEER 3,359,378

TWO-WAY AMPLIFIER

Filed Sept. 28, 1964 2 Sheets-Sheet 2

INVENTOR.
NICHOLAS D. SKEER
BY
ATTORNEY 3,359,378
Patented Dec. 19, 1967

3,359,378
TWO-WAY AMPLIFIER

Nicholas D. Skeer, Amherst, N.H., assignor to Sanders Associates, Inc., Nashua, N.H., a corporation of Delaware Filed Sept. 28, 1964, Ser. No. 399,791
11 Claims. (Cl. 179—170)

ABSTRACT OF THE DISCLOSURE

This invention relates to a two-way electronic amplifier which can be remotely controlled to reverse the direction of signal amplification. The amplifier is comprised of two substantially identical amplifier circuits arranged "front-to-back" so as to amplify in opposite directions, between first and second pairs of terminals. The amplifier circuits are arranged so that a direct current control signal applied to a first pair of terminals renders a selected one of the two amplifier circuits operative while effectively isolating the other amplifier circuit from the terminals. The operative amplifier not only amplifies the information signal but also transfers the control signal from the first pair of terminals through to another pair of terminals. This allows the control signal to be passed along to a further amplifier arranged such as in cascade in a transmission line.

This invention relates to an electronic amplifier remotely controllable to reverse the direction of signal amplification. The amplifier is particularly suited for use as a line amplifier cascaded along a communication cable or transmission line with other like amplifiers.

Prior line amplifiers that are remotely controllable to reverse the direction of amplification generally receive the control signals at terminals different from the input and output terminals for the message being amplified. Hence, to connect such an amplifier in a communication cable, at least one control signal conductor is required in the cable in addition to the message conductors. Still further control conduction maybe required where several such line amplifiers are connected in a cascaded sequence along a communication cable.

Accordingly, it is an object of the present invention to provide an improved amplifier remotely controllable to reverse the direction of signal amplification.

More particularly, it is an object of the invention to provide a two-way amplifier wherein the direction of amplification is controllable by means of the message conductors.

Another object is to provide amplifiers of the above character which can be cascaded along a communication cable.

A further object of the invention is to provide a remotely controllable two-way amplifier that receives the signals controlling the direction of amplification on one pair of message terminals and transfers the control signals to a second pair of message terminals.

It is also an object of the invention to provide an amplifier of the above character wherein the amplifier supply and bias voltages are derived from the control signal.

Other objects of the invention will be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

The invention achieves the foregoing features with an amplifier comprising two substantially identical amplifier circuits arranged "front-to-back" so as to amplify in opposite directions, between first and second pairs of terminals. The message signal to the composite amplifier arrives at one of the pairs of terminals and departs on the other pair, according to the direction of communication.

The amplifier circuits are arranged, as described in detail hereinafter, so that a direct-current control signal applied to the first pair of terminals renders a selected one of the amplifier circuits operative while effectively isolating the other amplifier circuit from the terminals. The operative amplifier circuit not only amplifies the message, it also transfers the control signal from the first pair of terminals through to the second pair. The control signal is thus passed along to the next amplifier on the line. In this manner, a number of amplifiers in cascade along the line may be controlled from one end of the line by means of the same pair of conductors that conduct the message signal.

A further feature of the two-way amplifier is that the two amplifier circuits thereof derive their operating and bias voltages from the control signal at the first pair of terminals. Thus, the control signal applied to two message conductors at one end of a communication cable both energizes, and selects the direction of amplification, of a plurality of the line amplifiers cascaded along the cable.

Figure 1:
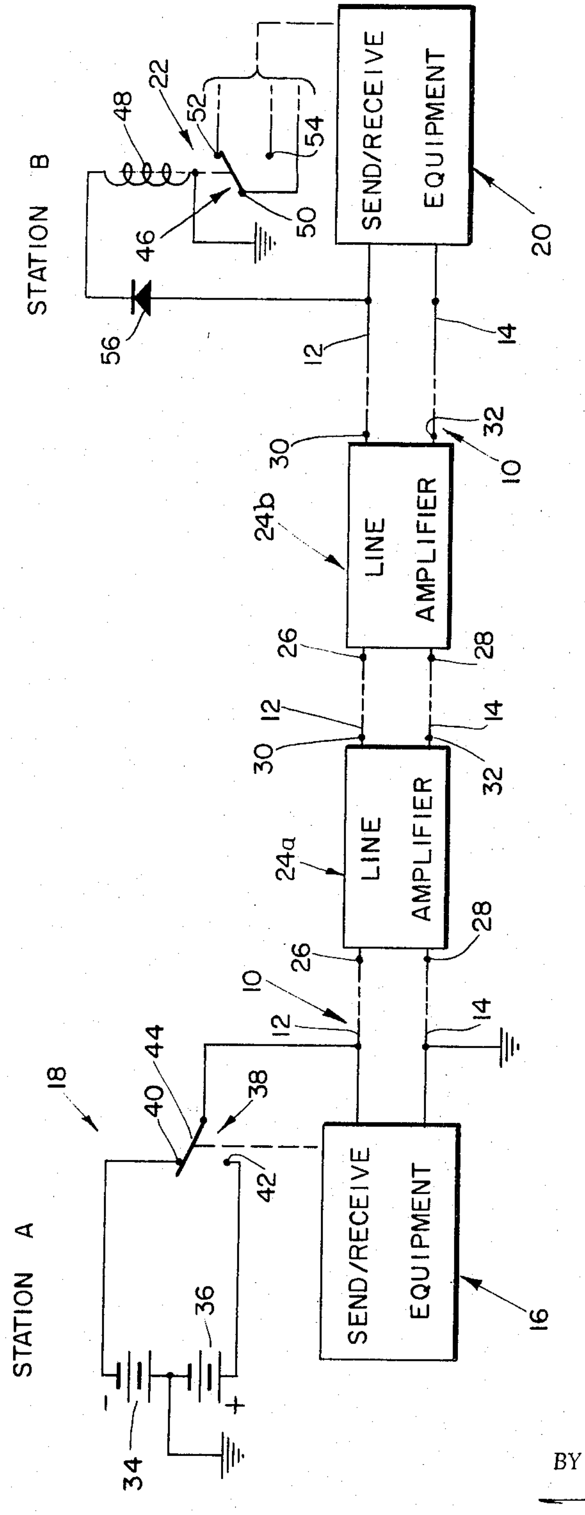
FIG. 1 is of a communication system illustrating features of the invention.

Turning now to FIG. 1, in a communication system embodying the invention, a cable 10 having message conductors 12 and 14 interconnects communication station A with station B. Send/receive equipment 16, illustratively comprising a microphone for sending out audio signals and a speaker for receiving audio signals, is connected to the cable message conductors at station A. A send/receive selector indicated at 18 is also connected to the cable at station A.

At station B, send/receive equipment 20 and a send/receive switch 22 are connected to the message conductors.

As also shown in FIG. 1, line amplifiers 24*a* and 24*b* are in series with the cable 10 at spaced intervals therealong. Each line amplifier can amplify signals travelling in either direction on the cable; the direction of amplification being determined by a control signal received from station A. The amplifier operating power is also derived from the control signal. Thus, only the two message conductors 12 and 14 are required; no additional conductors are needed in the cable 10, or elsewhere, between the stations A and B.

As described in detail below, each line amplifier receives the control signal at terminals 26–28 and transfers it to terminals 30–32. Thus, the station B switch 22 also receives the control signal. In response, it conditions the station B send/receive equipment 20 either to receive or to send a message to station A.

More specifically, the illustrated send/receive selector 18 comprises batteries 34 and 36 and a switch indicated at 38. The positive terminal of battery 34 and the negative terminal of battery 36 are connected to a common return conductor, illustrated as ground. The other battery terminals are connected with fixed switch contacts 40 and 42. The switch transfer contact 44 is connected with the cable conductor 12. The other cable conductor 14 is connected to ground.

The send/receive switch 22 at station B illustratively comprises a relay indicated at 46 having a coil 48. When the relay coil is energized, it moves an armature contact 50 from contact 52 to contact 54. The relay contacts are connected with the station B send/receive equipment 20 according to well-known conventional techniques to enable the equipment 20 to initiate and, alternatively, accept communication signals.

Also in the switch 22 is a diode 56 connected in series between the cable conductor 12 and the relay coil 48.

It will be understood that the invention is not limited to the details of the selector 18 or switch 22. They are merely illustrative of apparatus with which the line amplifiers 24*a* and 24*b* operate.

With the arrangement, shown in FIG. 1, in the receive condition, the station A switch 38 is in the position shown, with the transfer contact 44 engaging the fixed contact 40. The voltage on the battery 34 is thus applied as a control signal between the message conductors, with the conductor 12 at a negative control potential with respect to the conductor 14. This control voltage causes the amplifier 24*a* to provide an amplification path from right to left in FIG. 1, i.e. from terminals 30–32 thereof to terminals 26–28. The amplifier transfers the control signal in the opposite direction, i.e. to the amplifier 24*b*. In response, the amplifier 24*b* amplifies signals applied to its terminals 30–32, while transferring the control signal to the station B equipment. There, the negative control voltage on the conductor 12 is blocked by the diode 56 so that the relay 46 remains in the condition shown.

Alternatively, to place the communication system in the send condition, the switch transfer contact 44 at station A is moved to engage the fixed contact 42. The battery 36 is then connected between the cable conductors, placing the conductor 12 at a positive control voltage with respect to the conductor 14.

The amplifiers 24*a* and 24*b* now amplify signals applied to their terminals 26–28, in addition to transferring the control signal they receive at these terminals to the respective terminals 30–32.

The positive control voltage on message conductor 12 is thus applied to station B, where it is passed through the diode 56 and energizes the relay coil 48. In response, the armature contact 50 engages the fixed contact 54. This places the station B send/receive equipment in the receive condition, ready to accept message signals placed on the cable 10 at station A.

The details of the line amplifier 24*a* will now be described with reference to FIG. 2. The amplifier 24*b* is preferably identical to the amplifier 24*a*.

In general, the amplifier 24*a* comprises two subsidiary amplifiers 60 and 62, connected in parallel between the terminal pair 26–28 and the terminal pair 30–32. The amplifier 60 is arranged to amplify signals arriving at the terminal pair 26–28 and to apply them to the terminal pair 30–32, whereas the amplifier 62 is arranged to amplify signals travelling on the cable 10 in the opposite direction, i.e., arriving at the terminal pair 30–32.

The amplifier 60 has an input stage 64 employing a transistor 66 in a common-emitter configuration. A low impedance output stage 68, employing a transistor 70 connected as an emitter-follower, couples the output from the amplifier stage 64 to the cable 10. Similarly, the amplifier 62 has a common 25 emitter transistor 72 operating in an input stage 74, followed by a low impedance output stage 76 employing an emitter-follower transistor 78.

Only one of the amplifiers 60–62 operates at a time, the other being isolated from the cable according to the control voltage between the cable conductors 12 and 14.

More specifically, assume that a signal is to be transmitted from station A to station B (FIG. 1) so that the conductor 12 is at a positive control potential with respect to the conductor 14. The audio signal developed in the station A send/receive equipment 16 (FIG. 1) arrives at the amplifier terminals 26–28. In the amplifier 60, the control voltage between the cable conductors 12 and 14 forward biases a diode 80 to apply the audio signal to the base 82 of transistor 66 by way of a coupling capacitor 84. The transistor amplifies this signal by a factor approximately equal to the ratio of the resistance of a load resistor 86 to the resistance of an emitter resistor 88.

The supply voltage for the amplifier 60 appears between the terminal 28 and a common connection 90. It is derived from the control voltage between the terminals 26 and 28, and differs from the control voltage by the drop across a resistor 92 and a diode 94. The diode 94 is forward biased, and thus has a low resistance, when the cable conductor 12 is at a positive control voltage with respect to the cable conductor 14.

The resistor 92 and a bypass capacitor 96 form a filter that isolates the message signal from the supply for the control voltage, i.e. from the FIG. 1 batteries 34 and 36 at station A. The load resistor 86 is connected between the collector 98 and the connection 90. Base-emitter bias is provided in part by a voltage divider comprising resistors 100 and 102 connected between the connection 90 and terminal 28. Also, resistors 88 and 104 are connected in series between the transistor emitter 106 and the cable conductor 14, with an audio bypass capacitor 108 shunting the resistor 104.

The amplified signal output from the amplifier stage 64, developed between the collector 98 and the conductor 14, is direct coupled between the base 110 and emitter 112 of the transistor 70. A resistor 114 connects the emitter 112 to the conductor 14 and the collector 116 of the transistor 70 is connected directly to the common connection 90.

A capacitor 118 couples the output signal from the amplifier 60, developed across the resistor 114, to the amplifier terminals 30 and 32.

Figure 2:
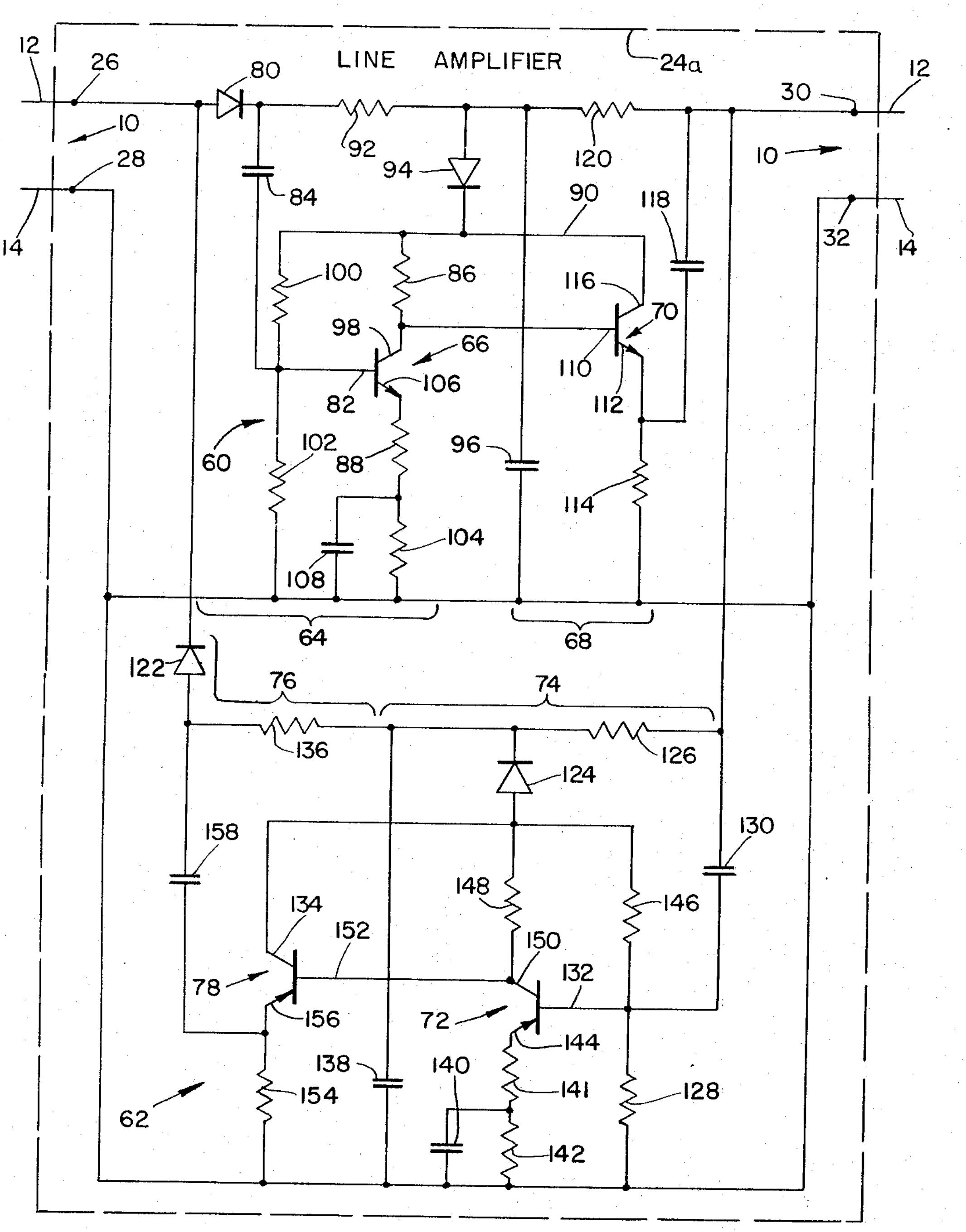
FIG. 2 is a schematic diagram of an amplifier embodying the invention and used in the system of FIG. 1.

As also shown in FIG. 2, a resistor 120 is connected between the terminal 30 and the junction of resistor 92 and capacitor 96, to form, with the resistor 92 and the diode 80, a unidirectional current path between the terminal 26 and the terminal 30. The resistor 120 and capacitor 96 operate as a filter to prevent feedback of the audio output signal to the connection 90 and more importantly, they prevent feedback to the input terminals 26–28 of amplifier 60.

The direct connection between terminals 28 and 32 and the path through diode 80 and resistors 92 and 120 combine to transfer the control signal from the terminal pair 26–28 to the terminals 30 and 32 for operating succeeding line amplifiers connected in the cable 10 and ultimately for operating the transmit/receive switch 22 at station B. The resistors 92 and 120 are selected to present to the audio signal an impedance that is markedly larger than the audio frequency impedance presented to the terminals 26–28 by the signal path through the transistor 66. This minimizes "loading" of the amplifiers by these resistors.

With the positive D.C. control voltage between the cable conductors 12 and 14, providing the above operation of the amplifier 60, diodes 122 and 124 in the amplifier 62 are reverse biased and the transistors 72 and 78 draw essentially no current. Also, substantially all of the audio signal input at the terminals 26–28 is applied to the amplifier 60. Moreover, in the amplifier 62, the resistances of the resistors 126 and 128, both capacitively coupled between the terminals 30–32, are much larger than the output impedance of the amplifier 60. Accordingly, the amplifier 62 absorbs a relatively negligible portion of the audio output signal developed by the amplifier 60 across the terminal pair 30–32.

During reception of signals at station A, the switch 38 is in the position shown in FIG. 1 and the battery 34 is connectable in the control circuit. As a result, the message conductor 12 of the cable 10 is at a negative control voltage with respect to the cable conductor 14. This control signal forward biases the diodes 122 and 124 in the amplifier 62 and these diodes conduct with relatively little resistance.

In the amplifier 62, the audio signal from station B arrives at the terminals 30–32 and is applied through capacitor 130 to the base 132 of the transistor 72. Again, the amplifier supply voltage is derived from the control signal at the terminals 26 and 28. It appears between a common connection 134 and the cable conductor 14. The connection 134 is isolated from the audio signals at the input and output of the amplifier 62 by a filter comprising series resistors 126 and 136 and a bypass capacitor 138.

A resistor 141 in series with the parallel combination of a bypass capacitor 140 and a resistor 142 connects the transistor emitter 144 to the terminal 32. The other bias resistors for the transistor 72 are resistors 146 and 128 connected as a voltage divider for the transistor base 132. A load resistor 148 is between the transistor collector 150 and the connection 134.

The amplified output signal from the transistor 72 is director coupled from the collector 150 to the base 152 of the emitter-follower transistor 78. The transistor 78 has an output resistor 154 connected between its emitter 156 and the amplifier terminal 28. A capacitor 158 couples the audio signal output from the emitter-follower stage 76 to the forward-biased diode 122 connected to the terminal 26.

The resistors 126 and 136 provide a direct-current path to transfer the control signal for the receiving operation from the terminal pair 26–28 to the terminal pair 30–32.

During operation of the amplifier 62, the negative control voltage on the message conductor 12 reverse biases the diodes 80 and 94 in the amplifier 60 and thereby maintains the transistors 66 and 70 therein non-conducting. Thus, the amplifier circuit 60 is effectively isolated from the cable 10 and absorbs effectively none of the audio output signal at the terminal pairs 26–28. With the relatively high resistance of the resistor 120 it absorbs very little of the audio input signal at the terminals 30–32.

As noted above, the unbypassed resistor 88 in series with the emitter of transistor 66 in amplifier 60 and the corresponding resistor 141 connected with the transistor 72 in amplifier 62, are effective in controlling the gain of the respective amplifiers. Generally, these resistors may be eliminated to obtain maximum gain.

It will be seen that the amplifiers 60 and 62 are essentially identical. The amplifier 60 employs npn transistors, whereas the amplifier 62, operating with a supply voltage of the opposite polarity, employs pnp transistors.

However, it will be noted that the amplifier 60 has an isolating diode, the diode 80, in its input circuit, whereas the amplifier 62 does not have a corresponding diode. On the other hand, the amplifier 62 has the diode 122 in its output circuit and there is no corresponding diode in the amplifier 60. These differences stem from the fact that the supply voltages, provided by the control signals, are somewhat smaller at the terminals 30–32 than at the terminals 26–28.

The line amplifier 24*a* has essentially identical operating characteristics for message signals travelling in either direction on the cable 10. The direct-current control signals applied to the cable conductors determine the direction in which the amplifier provides amplification and they also power the transistors. Transmission of the control signals by the amplifier permits cascading of similar amplifiers at intervals along the cable 10, as shown in FIG. 1, with all the amplifiers being powered and controlled from station A. It also permits transmission of the control signals to station B for operation thereof as described above. All of this is accomplished with only two cable conductors, with the amplifiers inserted in series in one of the conductors.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A two-way amplifier having first and second paired terminals and third and fourth paired terminals, said amplifier applying to said third and fourth terminals an amplified output signal corresponding to a signal input at said first and second terminals when a first control voltage is between said first and second terminals and applying to said first and second terminals an amplified output signal corresponding to a signal input at said third and fourth terminals when the control voltage between said first and second terminals has an opposite, second polarity said amplifier comprising in combination (A) a first amplifier circuit having
   (1) a pair of input terminals connected to said first and second terminals, and a pair of output terminals connected to said third and fourth terminals,
   (2) a first unidirectional conduction element, a first resistor, and a second resistor connected in series succession between said first and third terminals and forming a unidirectional direct current path from said first terminal to said third terminal, and
   (3) amplifying means forming an alternating current signal path from the common connection of said element and first resistor to said third terminal, and (B) a second amplifier circuit having
   (1) a pair of input terminals connected to said third and fourth terminals, and a pair of output terminals connected to said first and second terminals,
   (2) a second unidirectional conduction element, a third resistor and a fourth resistor connected in series succession between said first and third terminals and forming a unidirectional direct current path from said third to said first terminals, and
   (3) amplifying means forming an alternating current signal path form said third terminal to the common connection of said second element and third resistor.

2. The amplifier defined in claim 1 in which
(A) said amplifying means of said first amplifier circuit includes first polarity-sensitive means interrupting said alternating current path therethrough when said second control voltage is between said first and second terminals, and
(B) said amplifying means of said second amplifier circuit includes second polarity-sensitive means interrupting said alternating current path therethrough when said first control voltage is between said first and second terminals.

3. The amplifier defined in claim 1 in which
(A) said first amplifying circuit further comprises a first capacitor connected between said second terminal and the common connection of said first and second resistors, and
(B) said second amplifying circuit further comprises a second capacitor connected between said second terminal and the common connection of said third and fourth resistors.

4. The amplifier defined in claim 1 in which each of said amplifying circuits includes means forming a series resistance-capacitance circuit between said third and fourth terminals.

5. In a two-way amplifier having first and second paired terminals and third and fourth paired terminals, said two-way amplifier applying to said third and fourth terminals an amplified output signal corresponding to a varying signal input at said first and second terminals when a first control voltage is between said first and second terminals, and applying to said first and second terminals an amplified output signal corresponding to a varying signal input at said third and fourth terminals when the control voltage between said first and second terminals has an opposite second polarity, a first amplifier circuit comprising the combination of (A) an amplifier stage having input terminals and output terminals, (B) first polarity-sensitive switch means (1) connected between said first terminal and said amplifier stage input terminal, and (2) coupling said amplifier stage in circuit with said first and second terminals when said first control voltage is present and isolating said amplifier stage from said first and second terminals when said second control voltage is present, (C) said first polarity-switch means in series succession with at least a first resistor between said first and third terminals forming a unidirectional current path from said first to said third terminal, and (D) an impedance-transforming stage whose input is the output of said amplifier stage and whose output is capacitively coupled between said third and fourth terminals, a second amplifier circuit comprising the combination of (A) a further amplifier stage having input terminals capacitively coupled with said third and fourth terminals and having output terminals, (B) a further impedance transforming stage whose input is the output of said further amplifier stage and having output terminals, (C) a first further polarity-sensitive switch means (1) connected between one of said first and second terminals and an output terminal of said further impedance transforming stage, and (2) coupling said further amplifier stage and further impedance transforming stage in circuit with said first and second terminals when said second control voltage is present, and isolating said further stages from said first and second terminals when said first control voltage is present, and (D) at least a second further resistor in series with said first further polarity-sensitive switch means between one of said first and second terminals and one of said third and fourth terminals.

6. The amplifier defined in claim 5 in which said first amplifier circuit further comprises (A) a common supply connection, (B) a resistive supply and bias network connected with said amplifier stage between said common supply connection and said second terminal, and (C) second polarity-sensitive switch means connected between said common connection and the end of said first resistor remote from said first switch means.

7. The amplifier defined in claim 5 in which said second amplifier circuit further comprises, (A) a further common supply connection, (B) a further resistive supply and bias network connected with said further amplifier stage between said further common supply connection and said fourth terminal, and (C) a second further polarity-sensitive switch means connected between said further common supply connection and the end of said further second resistor remote from said first further switch means.

8. An amplifier having first and second paired terminals and third and fourth paired terminals, said amplifier comprising in combination (A) a first diode having its anode connected to said first terminal, (B) a first capacitor connected to said second terminal, (C) a first resistor in series between said first capacitor and said first diode, (D) a first transistor arranged in a common emitter circuit, (E) a second capacitor connected between the base of said first transistor and the common connection of said first diode and said first resistor, (F) a second transistor arranged in an emitter-follower circuit with its base connected to the collector of said first transistor and with its emitter capacitively coupled to said third terminal, (G) a second resistor connected between the emitter of said second transistor and said fourth terminal, (H) a third resistor connected from said third terminal to the common connection of said first resistor and first capacitor, (I) a third transistor arranged in a common emitter circuit with its base capacitively-coupled to said third terminal, (J) a fourth transistor arranged in an emitter-follower circuit with its base connected to the collector of said third transistor, (K) a second diode having its cathode connected to said first terminal, (L) a third capacitor connected between the anode of said second diode and the emitter of said fourth transistor, (M) a fourth resistor connected between the emitter of said fourth transistor and said second terminal, (N) fifth and sixth resistors connected in series succession between the anode of said second diode and said third terminal, and (O) a fourth capacitor connected between said second terminal and the common connection of said fifth and sixth resistors.

9. The amplifier defined in claim 8 in which (A) said first and second transistors are pnp transistors, and (B) said third and fourth transistors are npn transistors.

10. The amplifier defined in claim 8 in which said second and fourth terminals are connected together.

11. The amplifier defined in claim 10 further comprising (A) a first common supply connection direct-coupled with the collector of said second transistor and with the base and the collector of said first transistor, (B) a third diode connected between said first supply connection and the common connection of said first and third resistors with the diode cathode connected to the supply connection, (C) a second supply connection direct-coupled with the collector of said fourth transistor and with the base and collector of said third transistor, and (D) a fourth diode connected between said second supply connection and the common connection of said fifth and sixth resistors with the diode anode connected to the supply connection.

References Cited

UNITED STATES PATENTS 3,175,050 3/1965 Oxman ------------ 179—170

KATHLEEN H. CLAFFY, *Primary Examiner.*

H. ZELLER, *Assistant Examiner.*

UNITED STATES PATENT OFFICE

CERTIFICATE OF CORRECTION

Patent No. 3,359,378 December 19, 1967

Nicholas D. Skeer

It is hereby certified that error appears in the above numbered patent requiring correction and that the said Letters Patent should read as corrected below.

Column 3, line 62, strike out "25"; column 4, line 72, for "connectable" read -- connected --; column 5, line 21, for "director" read -- direct --; column 6, line 51, for "form" read -- from --.

Signed and sealed this 14th day of January 1969.

(SEAL)
Attest:

Edward M. Fletcher, Jr.
Attesting Officer

EDWARD J. BRENNER
Commissioner of Patents